United States Patent

Slattery

(10) Patent No.: US 7,156,276 B2
(45) Date of Patent: Jan. 2, 2007

(54) APPARATUS AND SYSTEM FOR WELDING PREFORMS AND ASSOCIATED METHOD

(75) Inventor: Kevin T. Slattery, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 162 days.

(21) Appl. No.: 10/897,261

(22) Filed: Jul. 22, 2004

(65) Prior Publication Data

US 2006/0016854 A1    Jan. 26, 2006

(51) Int. Cl.
*B23K 31/02* (2006.01)
(52) U.S. Cl. ...................................................... 228/2.1
(58) Field of Classification Search ................ 228/2.1, 228/44.3, 44.5, 112.1, 212, 213
See application file for complete search history.

(56) References Cited

U.S. PATENT DOCUMENTS

| | | | | |
|---|---|---|---|---|
| 2,754,708 A * | 7/1956 | Peterson | ..................... | 269/224 |
| 3,324,535 A * | 6/1967 | Johnson | ..................... | 29/281.5 |
| 3,612,389 A * | 10/1971 | Green | ........................ | 228/44.3 |
| 4,221,319 A * | 9/1980 | Paice | ............................ | 228/25 |
| 5,172,846 A * | 12/1992 | Hayashi et al. | ............... | 228/5.7 |
| 5,460,317 A | 10/1995 | Thomas et al. | | |
| 5,468,334 A * | 11/1995 | Searle | ......................... | 156/580 |
| 5,630,269 A * | 5/1997 | Wasserbaech et al. | ........ | 29/559 |
| 6,051,325 A | 4/2000 | Talwar et al. | | |
| 6,168,067 B1 | 1/2001 | Waldron et al. | | |
| 6,302,315 B1 | 10/2001 | Thompson | | |
| 6,460,752 B1 * | 10/2002 | Waldron et al. | ......... | 228/112.1 |

* cited by examiner

*Primary Examiner*—Jonathan Johnson
(74) *Attorney, Agent, or Firm*—Alston & Bird LLP

(57) ABSTRACT

An assembly for positioning a structural assembly for friction stir welding, and a system and method for friction stir welding the structural assembly are provided. The assembly includes a frame defining an aperture therein, and at least one structural member positioned within the aperture. The assembly also includes at least one spacer positioned within the aperture such that the spacer and structural member substantially fill the aperture to secure the structural member within the frame, as well as a substrate secured to the frame and positioned adjacent to the structural member in an overlapping configuration to define an interface between the substrate and structural member. In this configuration, the substrate and structural member are capable of being friction stir welded together.

9 Claims, 5 Drawing Sheets

APPARATUS AND SYSTEM FOR WELDING PREFORMS AND ASSOCIATED METHOD

BACKGROUND OF THE INVENTION

1) Field of the Invention

The present invention relates to friction stir welding and, more particularly, to positioning a structural assembly for friction stir welding and friction stir welding the structural assembly to form a preform.

2) Description of Related Art

Friction stir welding is a process in which a rotating tool, such as a pin or probe, is urged into and/or through a workpiece, e.g., to join multiple members of the workpiece in a solid state or to repair cracks in a workpiece. Typically, the pin extends from a shoulder, which can be flat, concave, or otherwise contoured, and the shoulder is urged against the workpiece so that the pin is urged therein. The pin is then urged through the workpiece to form a continuous weld joint. For example, during one conventional friction stir welding process, the probe of the rotating tool is plunged into a workpiece or between two workpieces by a friction stir welding machine to produce the required resistance force to generate sufficient frictional heating to form a region of plasticized material. The tool can be tilted approximately 3° relative to the workpiece such that the trailing edge of the shoulder is thrust into and consolidates the plasticized material. Upon solidification of the plasticized material, the members of the workpiece are joined along the weld joint. The magnitude of force exerted by the friction stir welding tool must be maintained above a prescribed minimum in order to generate the required frictional heating. Friction stir welding is further described in U.S. Pat. No. 5,460,317 to Thomas et al., the contents of which are incorporated herein by reference.

Friction stir welding has been demonstrated to be a successful joining method for forming certain types of joints, such as the butt joint where the probe is inserted within abutting edges of two structural members, or a lap joint in which the probe is inserted in a direction substantially perpendicular to the interface between overlapping structural members. In addition, other types of friction welding have also been shown to be useful for forming certain joints.

Methods have also been used to friction stir weld preforms. One method includes inserting the probe through a structural member to one side of a center web substrate. Structural members are then added to the opposed second side of the substrate by turning the part over and inserting the probe through the additional structural members and into the substrate to weld the entire structure together. A second method involves welding the structural member to the substrate by inserting the probe through the substrate and into the underlying structural member. A second structural member is stacked on top of the substrate (opposite the previously welded structural member), and the probe is inserted through the second structural member and into the substrate to weld the structure together. Both methods require that each structural member be separately clamped for welding, which is expensive and time consuming.

It would therefore be advantageous to provide a system for friction stir welding preforms that is relatively inexpensive and effective. It would also be advantageous to provide an assembly to secure structures having various sizes during friction stir welding of preforms. It would further be advantageous to provide an assembly that promotes efficient assembly and disassembly before and after friction stir welding the structures into a preform.

BRIEF SUMMARY OF THE INVENTION

The invention addresses the above needs and achieves other advantages by providing an assembly for positioning a structural assembly for friction stir welding preforms, as well as an associated system and method for friction stir welding preforms. The structural assembly is capable of being arranged in a variety of configurations to secure the structural members during friction stir welding, to create various preforms, and to promote efficient assembly before friction stir welding and disassembly after welding.

In one embodiment of the present invention an assembly for positioning a structural assembly for friction stir welding is provided. The assembly includes a frame defining an aperture therein, and at least one structural member positioned within the aperture. The assembly also includes at least one spacer positioned within the aperture such that the spacer and structural member substantially fill the aperture to secure the structural member within the frame, as well as a substrate secured to the frame and positioned adjacent to the structural member in an overlapping configuration to define an interface between the substrate and structural member. In this configuration, the substrate and structural member are capable of being friction stir welded together.

In various embodiments of the present invention, the frame defines first and second opposed edges, the aperture extending between the first and second edges to define a thickness, and wherein the frame is the same thickness as the structural member, while the frame and structural member may be thicker than the spacer. In addition, the spacer may be positioned within the aperture to define a gap between at least a portion of the spacer and the structural member, or the spacer could contact at least a portion of the structural member. Further, the spacer may include a variety of cross sections, such as rectangular, circular, elliptical, or trapezoidal. The assembly may include a pair of spacers that are in abutting engagement along an angular surface relative to the structural member. Also, the assembly may include a pair of spacers in abutting engagement along an angular surface relative to the substrate, where one of the pair of spacers has a greater thickness than a respective other of the pair of spacers. The substrate may be secured to the frame with fasteners, or with a vacuum drawn through a port defined in the frame. The substrate could be positioned adjacent to the structural member such that at least one of a lap and butt joint may be formed. Furthermore, the assembly may also include at least one structural member and spacer positioned within the aperture on an opposite surface of the substrate in an overlapping configuration to define an interface between the opposite surface of the substrate and the structural member.

In an additional embodiment of the present invention, a system for friction stir welding is provided. The system includes a frame defining an aperture therein, and at least one structural member positioned within the aperture. The system also includes at least one spacer positioned within the aperture such that the spacer and structural member substantially fill the aperture to secure the structural member within the frame. In addition, a substrate is secured to the frame and positioned adjacent to the structural member in an overlapping configuration to define an interface between the substrate and structural member, and a probe is operable to reciprocate and penetrate the interface to friction stir weld the substrate and structural member together. In a variation of the probe, the probe extends substantially perpendicular to the interface and may include a shield extending substantially parallel to the interface. The shield comprises a non-rotating support member positioned adjacent to the structural member and spacer that is capable of securing the spacer within the aperture during friction stir welding.

The present invention also provides a method for friction stir welding. The method includes providing a frame defining an aperture therein, and positioning at least one structural member and at least one spacer within the aperture such that the spacer and structural member substantially fill the aperture to secure the structural member within the frame. The method also includes securing a substrate to the frame and adjacent to the structural member in an overlapping configuration to define an interface between the substrate and structural member, and urging a reciprocating probe through the interface to friction stir weld the substrate and structural member together into a preform.

In additional aspects of the method, the method includes positioning the spacer within the aperture such that a gap is defined between at least a portion of the spacer and the structural member, or such that the spacer contacts at least a portion of the structural member. The method may include forming one of a lap and butt joint between the substrate and the structural member. The method may include the additional step of removing the spacer from the aperture following the step of inserting the reciprocating probe. The probe is typically urged substantially perpendicular to the interface. The method may further include positioning a shield carried by the probe adjacent to the structural member and spacer, where the shield is capable of securing the spacer within the aperture during the urging of the probe. The method may also advantageously include positioning at least one structural member and spacer on an opposite surface of the substrate and thereafter urging the reciprocating probe through the interface defined between the opposite surface of the substrate and the at least one structural member such that a structural member is capable of being friction stir welded to the opposite surface of the substrate. In addition, the method may include machining the preform to form a structural assembly having a predetermined configuration.

In a variation of the present invention, an additional assembly for positioning a structural assembly for friction stir welding is provided. The assembly includes a frame defining an aperture therein, and a plurality of structural members positioned within the aperture. The assembly also includes a plurality of spacers positioned within the aperture such that the spacers and structural members substantially fill the aperture to secure the structural members within the frame. In this configuration, the structural members are capable of being friction stir welded to form a butt joint. In a further aspect of the assembly, a substrate is secured to the frame and positioned adjacent to the structural members in an overlapping configuration to define an interface between the substrate and structural members, wherein the substrate and structural members are capable of being friction stir welded together.

The present invention therefore provides an assembly that is capable of arranging structural members in a variety of configurations prior to friction stir welding. The assembly eliminates separate tooling for clamping each of the structural members prior to friction stir welding, which consequently reduces the cost of friction stir welding preforms. The spacers are capable of adequately securing the structural members during friction stir welding, and are shaped and sized to promote removal of the spacers following welding even when the structural members expand. Furthermore, the assembly is capable of positioning the structural members for fabricating a variety of preforms that may later be machined into a finished part.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
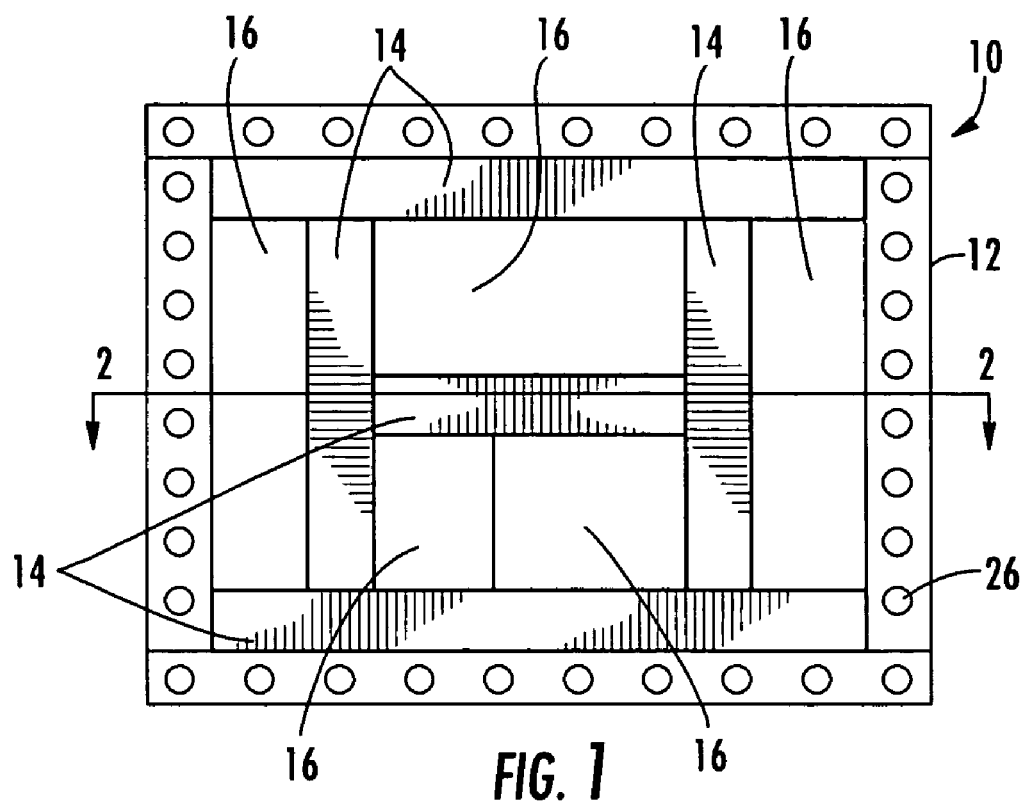
FIG. 1 is a plan view of an assembly for positioning a structural assembly for friction stir welding preforms according to one embodiment of the present invention.
Figure 2:
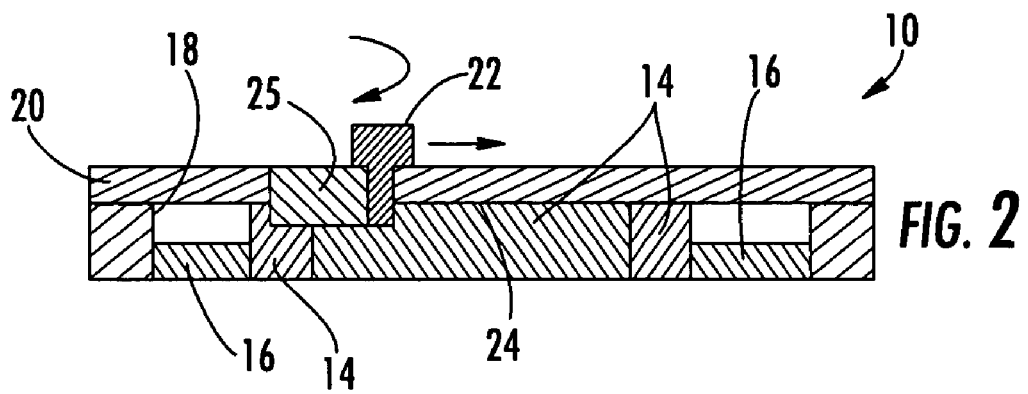
FIG. 2 is a cross-sectional view of the assembly of FIG. 1.

Referring now to the drawings and, in particular to FIGS. 1–2 there is shown a structural assembly 10 that is capable of being friction stir welded into a preform. The structural assembly 10 includes a frame 12 and a plurality of structural members 14 and spacers 16 arranged within an aperture 18 defined within the frame. A substrate 20 is positioned adjacent to the structural members 14, typically in an underlying or overlying relationship, such that a probe 22 can be used to friction stir weld the structural members and substrate together into a preform. A preform is generally an assembly of multiple structural members 14 that approximate the desired finished shape of a part, and which they can be machined or otherwise trimmed to the finished shape. The term "preform" is not meant to be limiting, as there could be any number and configuration of structural members 14 that are welded to the substrate 20. In addition, the preform could be at least two structural members 14 friction stir welded together without including a substrate 20.

Generally, at least two structural members 14 are positioned in an overlapping configuration with the substrate 20 to define an interface 24 therebetween that can be welded to form a joint weld. A lap joint generally extends substantially perpendicular to the interface 24, through one of the structural members 14, through the interface, and at least partially through the substrate 20. Similarly, the lap joint could extend through the substrate 20 and interface 24 and at least partially into the structural members 14. Alternatively, other types of joints can similarly be formed. For example, a butt joint can be formed by abutting the edge surfaces of the structural members 14 and welding through an interface 24 of the abutting surfaces. The structural members 14 can also be positioned and welded in other configurations, for forming both lap and butt joints, and any number of structural members 14 can be joined together or joined to the substrate 20.

The structural members 14 and substrate 20 can be formed of a variety of materials including, but not limited to, aluminum, aluminum alloys, titanium, titanium alloys, steel, and the like. Further, the preform can include structural members 14 and substrates 20 of similar or dissimilar materials, for example, structural members formed of different alloys of a base metal, including alloys that are unweldable or uneconomical to join by conventional fusion welding techniques. Unweldable materials, when joined by conventional fusion welding techniques, produce relatively weak weld joints that tend to crack during weld solidification. Such materials include aluminum and some aluminum alloys, particularly AA series 2000 and 7000 alloys. The use of friction stir welding permits structural members 14 and substrates 20 formed of unweldable materials to be securely joined. Friction stir welding also can be used to securely join weldable materials to other weldable and to unweldable materials. Thus, the materials that form the preform can be chosen from a wider variety of light weight, high strength metals and alloys, thereby facilitating reduction of the overall weight of the preform and a finished part formed therefrom.

The preform formed according to the methods of the present invention can be used in a variety of applications, including, for example, frames, panels, skins, airfoils, and the like for aeronautical and aerospace structures such as aircraft and spacecraft, for marine vehicles, automobiles, and the like, as well as for other applications outside of the transportation industry. The friction stir weld joints can be used for joining large preforms having a variety of geometries. The preforms should approximate the desired dimensions and configuration of the final part to reduce the machining time required during machining, as well as reduce waste material.

Figure 5:
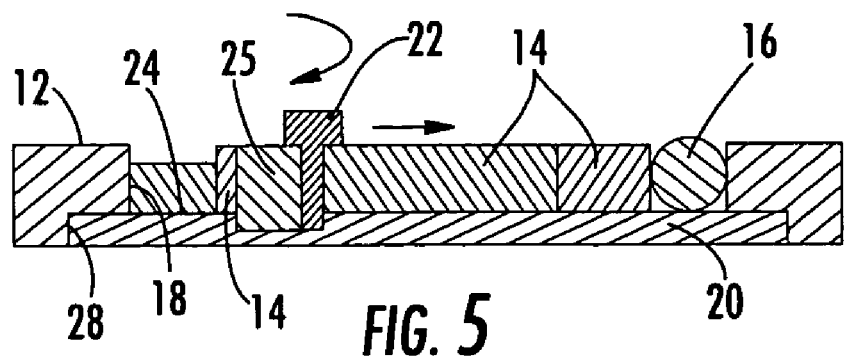
FIG. 5 is a cross-sectional view of the assembly of FIG. 4.

As shown in FIG. 1, a plurality of structural members 14 and spacers 16 are arranged within the aperture 18. FIG. 2 demonstrates that a substrate 20 is positioned to overlie the structural members 14, which defines an interface 24. A probe 22 is inserted through the substrate 20 and interface 24 into an underlying structural member 14. As shown in FIG. 5, the probe 22 may also be inserted from the opposite direction through a structural member 14 and interface 24 into the underlying substrate 20. The probe 22 may be inserted substantially perpendicular to the interface 24, although it is understood that "substantially perpendicular" is not meant to be limiting and could include extending the probe perpendicular or tilting the probe at a small angle (e.g., 0 to 3 degrees) relative to the substrate 20 and structural member 14. The probe 22, which is made of a harder material than either the substrate 20 or structural member 14, rotates as it is translated to generate frictional heat within the substrate and structural member to at least partially plasticize the substrate and structural member. Upon cooling of the plasticized material 25, the substrate 20 and structural member 14 are joined along the resulting weld joint. Friction stir welding is further described in U.S. Pat. No. 5,460,317 to Thomas et al., the entire content of which is incorporated herein by reference.

Figure 4:
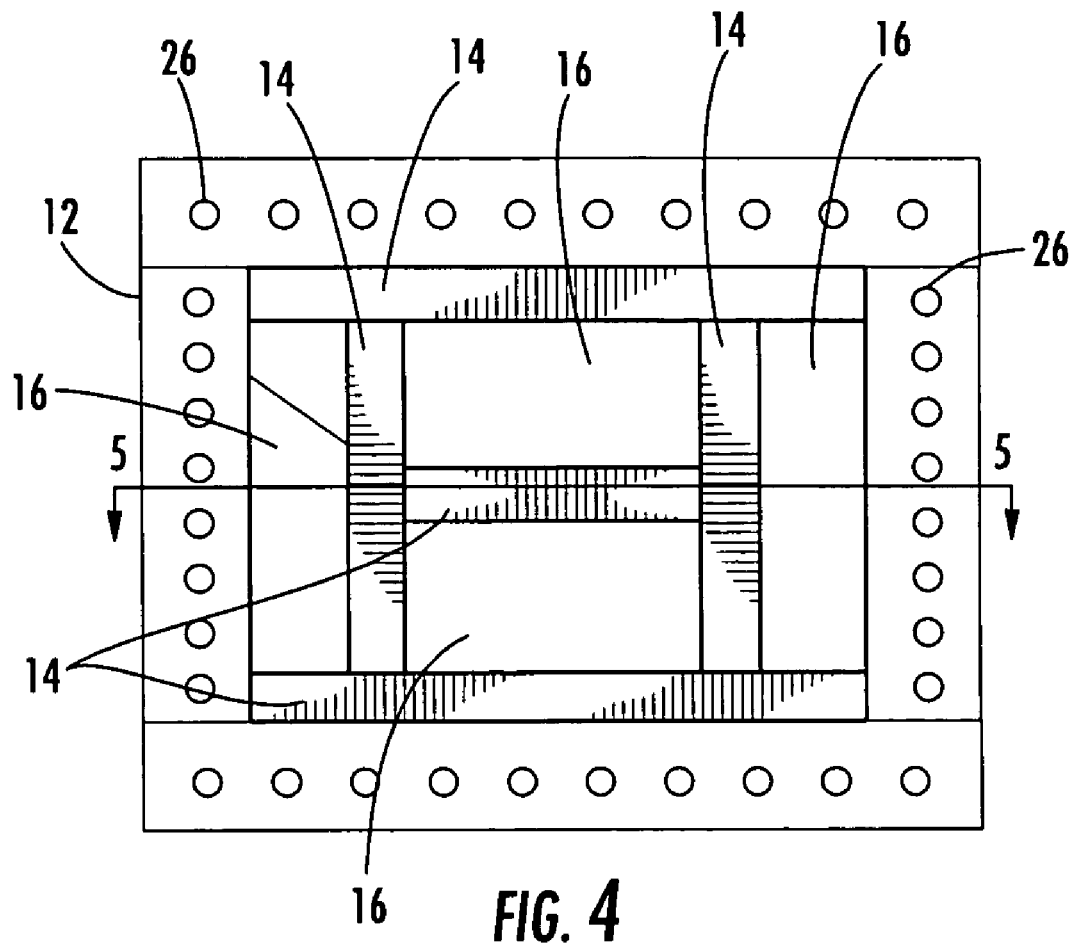
FIG. 4 is a plan view of an assembly for positioning a structural assembly for friction stir welding preforms according to another embodiment of the present invention.
Figure 6:
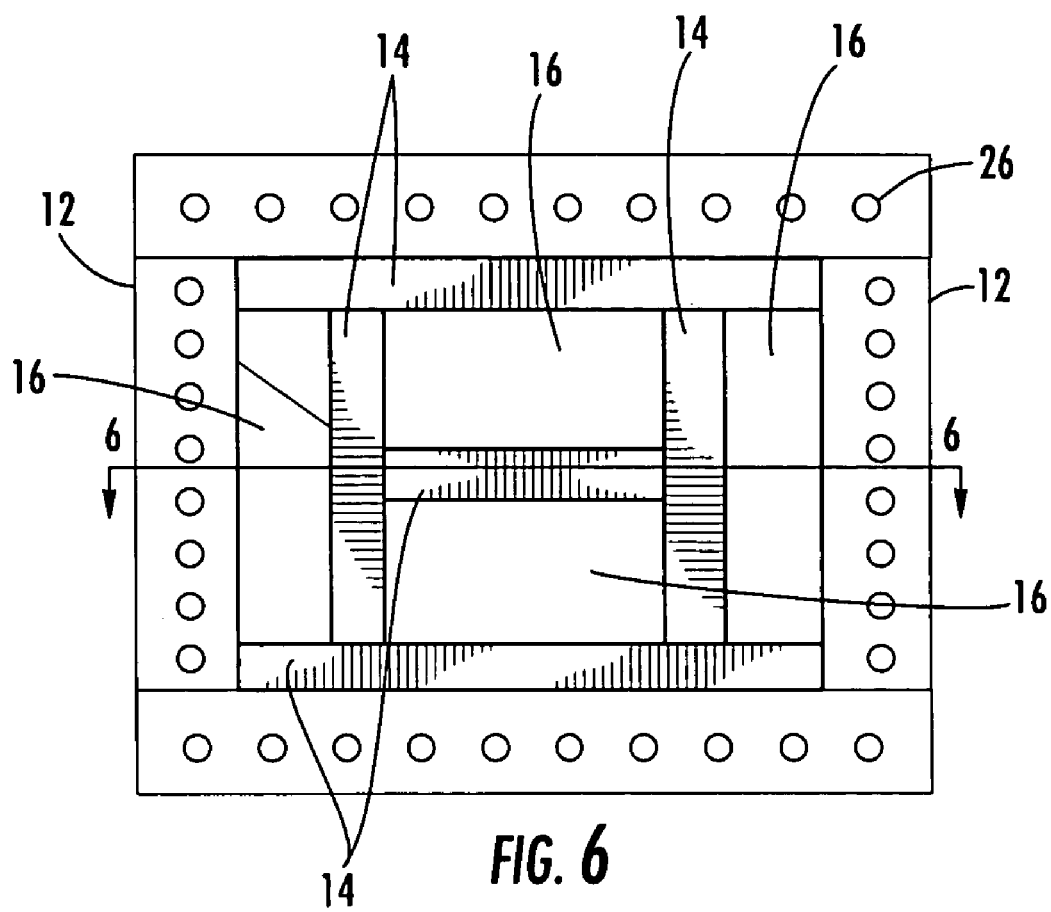
FIG. 6 is a plan view of an assembly for positioning a structural assembly for friction stir welding preforms according to yet another embodiment of the present invention.

The structural members 14 and spacers 16 are arranged within the aperture 18 defined by the frame 12 such that the structural members are secured within the frame. The structural members 14 and spacers 16 are sized and shaped to substantially fill the aperture (similar to a puzzle) so that the structural members are secured during friction stir welding. It is understood that the phrase "substantially fill" is not meant to be limiting and may be interpreted such that the structural members 14 and spacers 16 are positioned within the aperture 18 such that there could be various sized gaps between each of the structural members and spacers, or that there could be no gaps such that the structural members are firmly fixed within the aperture. Thus, a separate clamp is not required to secure each structural member 14 during friction stir welding. The structural members 14 and spacers 16 can be arranged in any desired configuration within the aperture 18, and consequently, the spacers 16 could be any desired dimension to accommodate the structural members 14. The structural members 14 shown in FIGS. 1, 4, and 6 are rectangular, although any geometry of structural members could be employed with corresponding spacers 16 according to additional embodiments of the present invention.

Figure 7:
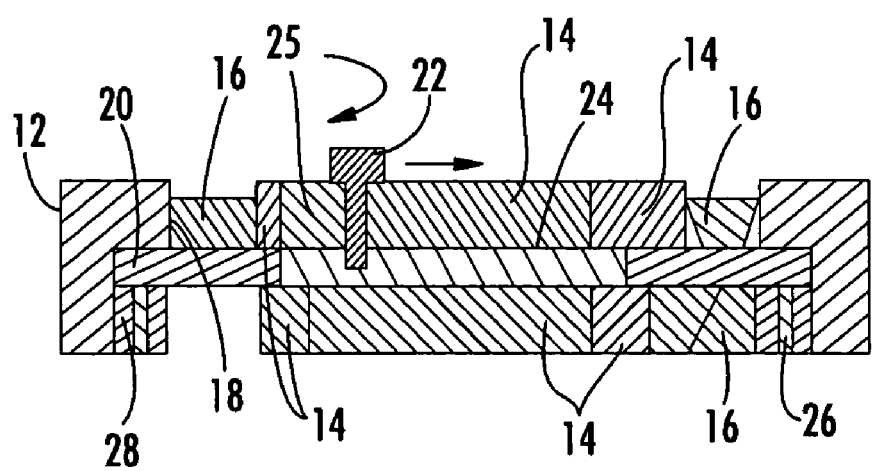
FIG. 7 is a cross-sectional view of the assembly shown in FIG. 6.

As discussed above, the substrate 20 is positioned adjacent to the structural members 14 to define an interface 24 therebetween, and it is possible to secure the substrate to the frame 12 and structural member 14 using a variety of techniques. The substrate 20 is typically secured so that there is minimal movement of the substrate during friction stir welding. The substrate 20 could be secured to the frame 12 with fasteners 26, as shown in FIG. 2. Alternatively, FIG. 5 illustrates that the substrate 20 may be secured within a recess 28 defined within the frame 12. Further, in the instance where the substrate 20 is positioned between structural members 14, as depicted in FIGS. 6–7, the substrate may be secured to the frame 12 with a combination of a recess 28 and fasteners 26. Thus, the frame 12 may be any suitable thickness and configuration to accommodate various assemblies for friction stir welding. In addition, the substrate 20 could be secured to an underlying machine bed with protrusions and/or a recess defined in the machine bed. In an additional embodiment, the substrate 20 is secured to the frame 12 and structural members 14 with a vacuum. A groove or port is defined in the frame 12 of this embodiment, wherein the substrate is positioned adjacent to the frame, and a vacuum is applied through the groove or port to retain the substrate adjacent to the frame 12 and structural members 14 to define the interface 24. Therefore, a variety of techniques may be used to secure the substrate 20 to the frame 12 and structural members 14 during friction stir welding, which are efficient to set up and to remove so that adjustments may be made during progressing stages of fabricating the preform.

Figure 3:
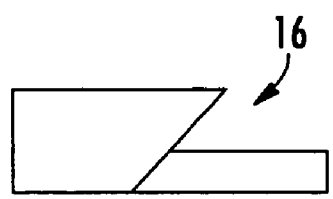
FIG. 3 is an elevation view of a spacer shown in FIG. 1 according to one embodiment of the present invention.

The spacers 16 are generally used to secure the structural members 14 within the aperture 18 during friction stir welding. The spacers 16 could be any dimension to accommodate any number or dimension of structural members 14. For example, FIG. 1 illustrates that the spacers 16 could be rectangular, while FIG. 3 shows that there could be a pair of spacers joined along an angular surface defined respective to the substrate 20. Furthermore, the spacer 16 could be a pair of spacers joined along an angular surface defined relative to the structural members 14, as shown in FIG. 4. Using a pair of spacers 16 defined along an angular surface promotes removal of the spacers following friction stir welding FIGS. 5 and 7 illustrate that the spacers 16 could be circular or trapezoidal in cross section. The circular and trapezoidal cross sections reduce the amount of area in contact with the structural members 14, substrate 20, and frame 12, which in turn, promotes removal of the spacers 16 following friction stir welding, while also securing the structural members in a desired configuration within the aperture 18. As such, the spacers 16 could be any cross section or dimension so that the contact area of each of the outer edges of the spacers is reduced when positioned within the aperture 18 and adjacent to the structural members 14, substrate 20, and frame 12.

Generally, the spacers 16 contact the substrate 20 and frame 12 when positioned within the aperture 18, although in additional embodiments of the present invention, a gap is defined between the spacers and the structural members 14 and substrate 20. Because the structural members 14 may expand during friction stir welding, providing a gap between the spacers 16 and structural members allows the structural members to expand slightly without seizing up on the spacers. For example, a gap of 0.050 inches may be provided between the structural members 14 and spacers 16. Further, to ensure that the preforms remain within acceptable dimensional tolerances for subsequent machining when gaps are provided between the structural members 14 and spacers 16, the structural members may include excess material on each of its surfaces that faces the spacers to allow for expansion during friction stir welding. For instance, in one embodiment of the present invention, the structural members 14 may include 0.2 inches of excess on each of its surfaces facing the spacers, although various amounts of excess may be provided depending on the desired amount of precision or the amount of machining required.

Gaps may also be defined between the spacers 16 and the substrate 20. Generally, the frame 12 includes opposed lateral edges, and the aperture 18 extends between the lateral edges to define a thickness. For example, one of the pair of spacers 16 shown in FIG. 3 may be substantially the same thickness (depicted as vertical thickness in this particular embodiment) as the structural members 14, while the corresponding other of the pair includes a smaller thickness than the structural members. Also, the rectangular spacers 16 shown in FIG. 1 could have a smaller thickness than the structural members 14 and frame 12. Providing a smaller thickness than the structural members 14 and frame 12 defines a gap between the spacer 16 and the interface 24, which promotes removal of the spacers following friction stir welding, allows expansion of the substrate 20 and structural members 14, and also prevents the spacers 16 from bridging, i.e., the spacers do not support the substrate 20 during friction stir welding.

The spacers 16 may be of any number of sizes and configurations for accommodating various structural members 14 and substrates 20. Thus, although FIG. 1 shows three individual spacers 16 and one pair of spacers, it is possible to have any number, size, and combination of spacers. Therefore, it is possible to include two, five, or any number of individual spacers 16, while incorporating spacers having any combination of circular, trapezoidal, or rectangular cross sections. The spacers 16 may not only be placed in the aperture 18 between the structural members 14 and frame 12, as the spacers could be located solely between structural members. Furthermore, there could be no gaps between the spacers 16 and the frame 12, structural members 14, and substrate 20, or the spacers may be stacked or oriented in various positions. Furthermore, different sizes of gaps may be provided between the spacers 16 and the structural members 14 and substrate 20 to allow for varying amounts of expansion during friction stir welding, while also securing the structural members within the aperture 24 and allowing for removal of the spacers. In addition, the spacers 16 may include various cross sections so that the contact area between the spacers and structural members 16, substrate 20, and frame 14 is reduced. Thus, the spacers 16 could be rectangular or square with rounded edges, elliptical, or even triangular or other shapes in cross section. The pair of spacers 16 having angular abutting surfaces, such as those shown in FIGS. 3–4 and 7, may abut one another at various angles to promote removal following friction stir welding. For example, in additional embodiments of the present invention, there could be a pair of spacers 16 positioned at 45 degrees or even perpendicular to one another.

The orientation and configuration of the spacers 16 promote removal following friction stir welding, as discussed previously. Different techniques for removing spacers 16 are used depending on the type of spacer employed during friction stir welding. For example, the pair of spacers 16 shown in FIG. 3 would be removed by first removing one of the pair of spacers, such as with a screw or other fastener. The screw could attach the pair of spacers 16 together, or the screw could be screwed through one of the pair until the screw contacts the substrate, and further advancing the screw causes the spacer to lift off of the substrate. Once one of the pair of spacers 16 is removed, the other of the pair can be removed, which in turn, loosens the remaining spacers and resulting preform located within the aperture 18. The remaining spacers 16 may be removed by hand or with fasteners, or the preform may be removed, leaving the spacers within the aperture 18. In instances where a rectangular, circular, trapezoidal, or other spacer 16 is incorporated, a fastener, such as a screw, could be inserted within the spacer and advanced until the screw contacts the substrate 20 and further advancement of the screw causes the spacer to lift off of the substrate. It is also understood that the spacers 16 could be removed by hand or by lifting the spacers with tools that lever the spacers out of the aperture.

The spacers 16 may be constructed of a variety of materials. The spacers 16 are generally made of a material that is capable of withstanding downward force during friction stir welding, as well as withstanding lateral forces within the aperture while supporting the structural members 14. In addition, the spacers 16 are generally capable of maintaining the structural members 14 within a desired dimensional accuracy such that the structural preforms can be machined to desired dimensions following friction stir welding. The spacers 16 could be formed by a variety of material processes, such as by sawing individual spacers from a larger block of material, cutting the spacers to a desired size with a water jet, casting, or other suitable process. Furthermore, the spacers 16 may be reusable or expendable, such that a spacer may be used one or more times, or only once for a specific preform.

Figure 8:
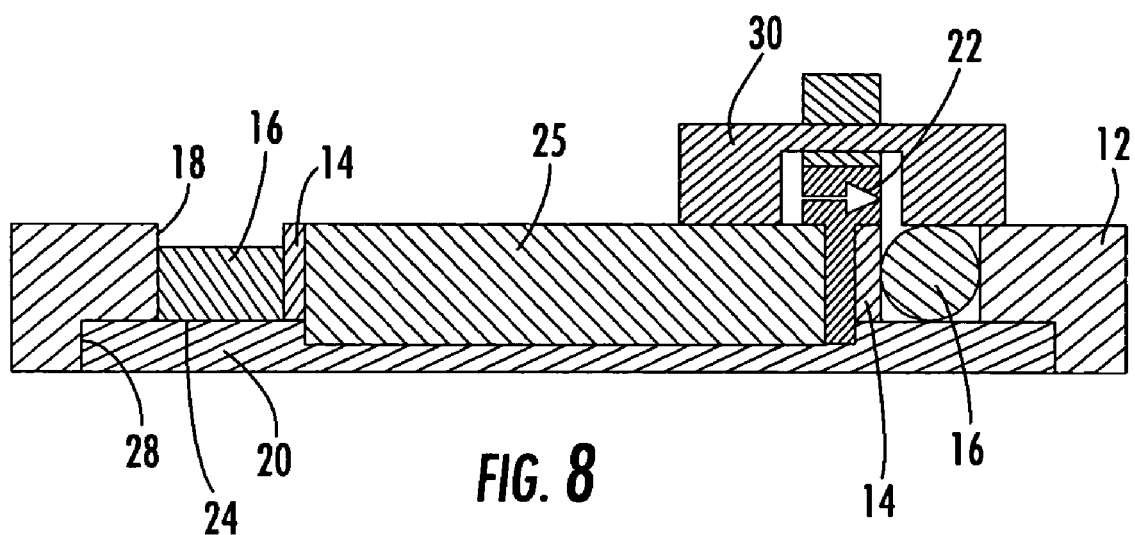
FIG. 8 is a cross-sectional view of the assembly shown in FIG. 4, illustrating a probe shield according to one embodiment of the present invention.

As shown in FIG. 8, the probe 22 may include a shield 30. The shield 30 does not rotate during friction stir welding, and is thus positioned adjacent to the structural members 14 and spacers 16 such that the shield may slide as the probe is advanced along the structural members and substrate 20. The shield 30 generally extends laterally outward from the probe 22 and provides a sufficient amount of surface area to maintain alignment with the structural members 14 and substrate 20, while also ensuring that the spacer 16 is adequately secured within the aperture while the probe is plasticizing an area proximate to the spacer. Thus, as shown in FIG. 8, the shield 30 may be positioned adjacent to the structural member 14 and frame 12, while also being positioned adjacent to the cylindrical spacer 16. The shield 30 could be circular in cross section and include a slot that allows the probe 22 to rotate uninhibited. The shield 30 could be attached to the surrounding mounting of the probe 22 such that the shield does not rotate. It is understood that various configurations of shields 30 may be employed with alternative embodiments of the present invention, while still providing sufficient support to the spacers 16 to ensure that the spacers are secured within the aperture and that the probe 22 rotates unrestrained during friction stir welding.

Figure 9:
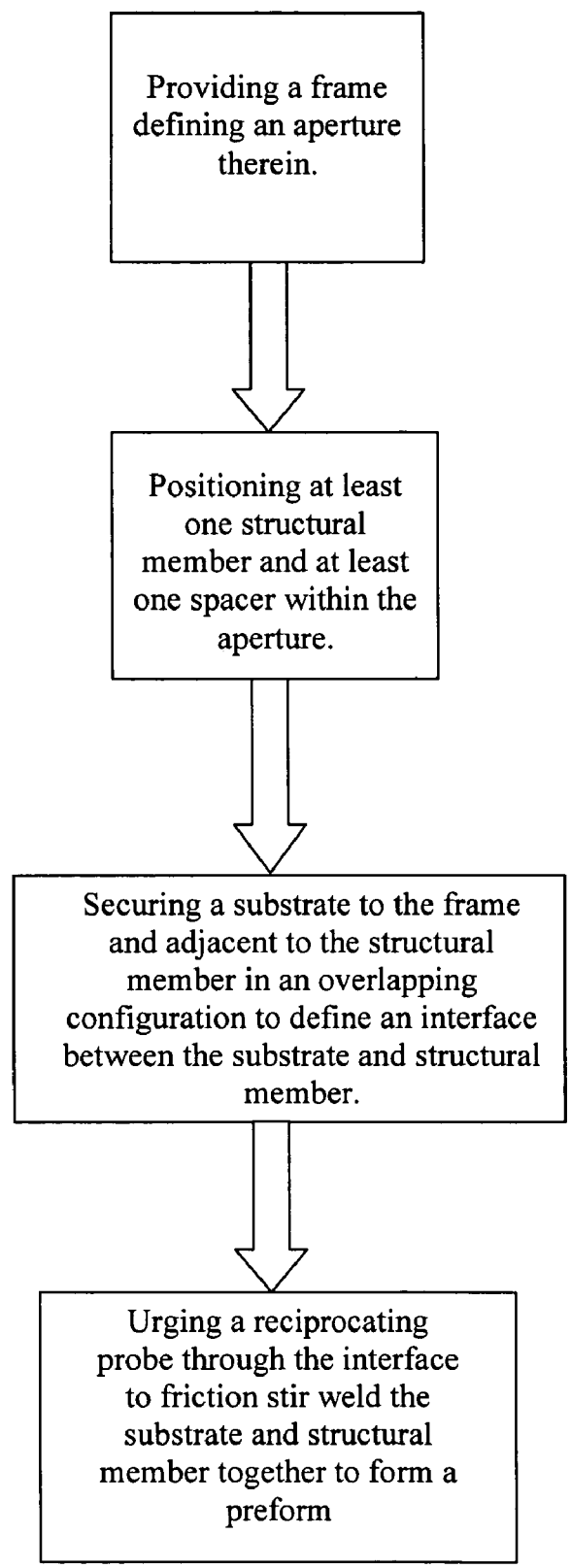
FIG. 9 is a flowchart illustrating the method for friction stir welding preforms according to one embodiment of the present invention.

Different techniques may be used to friction stir weld the structural members 14 and substrate 20 together. For instance, the flowchart shown in FIG. 9 demonstrates a method for friction stir welding preforms according to one embodiment of the present invention. The frame 12, defining an aperture 18 therein, is generally secured with fasteners 26 to an underlying base to secure the frame. As shown in FIG. 1, the structural members 14 and spacers 16 are positioned within the aperture 18 such that the aperture 24 is substantially filled to secure the structural members and spacers within the aperture. The substrate 20 is placed adjacent to the structural members 14 and fastened to the frame 12 such that an interface 24 is defined between the substrate and the structural members. A vacuum could be applied in place of, or in combination with, the fasteners 26 to secure the substrate 20 to the frame 12. The rotating probe 22 is then urged within the substrate, through the interface 24, and into the underlying structural member 14. The probe 22 is translated through the substrate 20 and structural member 14 as the probe is rotating to friction stir weld the substrate and structural member together. In this configuration a lap joint, as described above, may be formed between the substrate 20 and each of the structural members 14. Alternatively, as shown in FIG. 5, the probe 22 may be inserted through the structural members 14 and interface 24 and into the underlying substrate 20 to friction stir weld the structural members and substrate together. In this instance, the substrate 20 may be secured within a recess 28 defined in the frame 12.

Additionally, FIG. 7 illustrates that a second layer of structural members 14 may be friction stir welded to the opposite side of the substrate 20 by first friction stir welding the structural members on one side of the substrate to the substrate and then turning the substrate over and then repeating the steps outlined above for FIG. 5 to friction stir weld the structural members 14 on the opposite side of the substrate 20 to the substrate to form the preform. The substrate 20 may be secured by fasteners 26 to the frame 12, or a recess 28 in the frame may be used in place of, or in combination with, the fasteners. Furthermore, a second layer of structural members 14 may be friction stir welded to the structural assembly 10 shown in FIG. 2 by stacking a second layer of structural members 14 on top of the substrate 20 and then urging the probe 22 through the structural members 14 and interface 24 and into the underlying substrate 20.

It is understood that various friction stir welding techniques may be employed with the present invention in alternative embodiments. Although the techniques described above are directed to forming lap joints, it is understood that butt or other joints may also be formed in additional embodiments of the present invention. For example, the structural members 14 may be friction stir welded together without employing a substrate 20. In this configuration, the structural members 14 could be joined with lap or butt joints. In addition, it is understood that the substrate 20 could cover only a portion of the aperture 24, such that a combination of lap and butt joints may be formed.

Once the preform is created, a predetermined amount of excess material can be machined from the preform to form the machined structural assembly 10. The machining process can be performed by any known means, including using a manual or computer-guided machining device, such as a CNC machine. Advantageously, because the preforms closely or substantially approximate the predetermined dimensions and configuration of the corresponding machined structural assembly 10, the amount of machining is relatively small compared to, for example, the amount of machining that would be required to machine structural assemblies from solid blocks of material.

The present invention therefore provides a structural assembly 10 that is capable of arranging structural members 14 in a variety of configurations prior to friction stir welding. The structural assembly 10 eliminates separate tooling for clamping each of the structural members 14 prior to friction stir welding, which consequently reduces the cost of friction stir welding preforms. The spacers 16 are capable of adequately securing the structural members during friction stir welding, and are shaped and sized to promote removal of the spacers following welding even when the structural members 14 expand. Furthermore, the structural assembly 10 is capable of positioning the structural members 10 for fabricating a variety of preforms that may later be machined into a finished part.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for friction stir welding, comprising:
providing a frame defining an aperture therein;
positioning at least one structural member and at least one spacer within the aperture such that the spacer and structural member substantially fill the aperture to secure the structural member within the frame;
securing a substrate to the frame and adjacent to the structural member in an overlapping configuration to define an interface between the substrate and structural member; and
urging a reciprocating probe through the interface to friction stir weld the substrate and structural member together to form a preform.

2. A method according to claim 1, wherein positioning comprises positioning the spacer within the aperture such that a gap is defined between at least a portion of the spacer and the structural member.

3. A method according to claim 1, wherein positioning comprises positioning the spacer within the aperture such that the spacer contacts at least a portion of the structural member.

4. A method according to claim 1, wherein securing comprises forming one of a lap and butt joint between the substrate and the structural member.

5. A method according to claim 1, further comprising removing the spacer from the aperture following the urging of the reciprocating probe.

6. A method according to claim 1, wherein urging comprises urging the probe substantially perpendicular to the interface.

7. A method according to claim 1, further comprising positioning at least one structural member and spacer on an opposite surface of the substrate and thereafter urging the reciprocating probe through the interface defined between the opposite surface of the substrate and the at least one structural member such that a structural member is capable of being friction stir welded to the opposite surface of the substrate.

8. A method according to claim 1, further comprising positioning a shield carried by the probe adjacent to the structural member and spacer, the shield capable of securing the spacer within the aperture during the urging of the probe.

9. A method according to claim 1, further comprising machining the preform to form a structural assembly having a predetermined configuration.

* * * * *